(12) United States Patent
Meyer et al.

(10) Patent No.: US 10,131,342 B2
(45) Date of Patent: Nov. 20, 2018

(54) ENGINE FRICTION MODEL ADAPTATION (71) Applicant: Ford Global Technologies, LLC, Dearborn, MI (US)

(72) Inventors: Jason Meyer, Canton, MI (US); Rajit Johri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 15/378,437

(22) Filed: Dec. 14, 2016

(65) Prior Publication Data

US 2018/0162347 A1 Jun. 14, 2018

(51) Int. Cl.
*B60L 11/14* (2006.01)
*B60W 20/10* (2016.01)
*B60L 11/18* (2006.01)
*B60W 20/50* (2016.01)

(52) U.S. Cl.
CPC .............. *B60W 20/10* (2013.01); *B60L 11/14* (2013.01); *B60L 11/1851* (2013.01); *B60W 20/50* (2013.01); *B60L 2210/10* (2013.01); *B60L 2240/12* (2013.01); *B60L 2240/423* (2013.01); *B60L 2240/445* (2013.01); *B60L 2240/507* (2013.01); *B60W 2510/0208* (2013.01); *B60W 2510/0241* (2013.01); *B60W 2510/0676* (2013.01); *B60W 2710/0605* (2013.01); *B60W 2710/083* (2013.01); *B60W 2720/10* (2013.01); *B60Y 2300/433* (2013.01); *B60Y 2300/91* (2013.01); *B60Y 2400/112* (2013.01); *Y10S 903/93* (2013.01)

(58) Field of Classification Search
CPC .. B60L 11/1851; B60L 11/14; B60L 2240/12; B60L 2240/423; B60L 2240/445; B60L 2240/507; B60W 2510/0208; B60W 2510/0241; B60W 2710/0605; B60W 2710/083; B60W 20/10; B60Y 2300/433
USPC ............ 701/22; 180/197; 475/47, 53, 60, 76
See application file for complete search history.

(56) References Cited

U.S. PATENT DOCUMENTS

| | | | |
|---|---|---|---|
| 7,644,812 B2 * | 1/2010 | Simpson | F16H 61/62 192/3.26 |
| 7,815,026 B2 * | 10/2010 | Povirk | F16H 45/02 192/3.26 |
| 8,715,136 B1 | 5/2014 | Dai et al. | |
| 9,120,482 B2 | 9/2015 | Kobayashi et al. | |
| 2009/0093339 A1 * | 4/2009 | Chen | F16H 61/143 477/61 |
| 2016/0031431 A1 | 2/2016 | Johri et al. | |

* cited by examiner

*Primary Examiner* — Dalena Tran
(74) *Attorney, Agent, or Firm* — David B. Kelley; Brooks Kushman P.C.

(57) ABSTRACT

A hybrid powertrain includes an engine having a crankshaft and a throttle body, and an electric machine having a rotor selectively coupled to the crankshaft via a disconnect clutch. A transmission of the powertrain includes a torque converter having an impeller fixed to the rotor, a turbine disposed on an input shaft of the transmission, and a bypass clutch configured to selectively transmit torque from the impeller to the turbine. A vehicle controller is programmed to, in response to the bypass clutch being open or slipping and the disconnect clutch being closed, command a throttle position of the throttle body based on an error between measured and estimated speeds of the impeller.

20 Claims, 4 Drawing Sheets

ENGINE FRICTION MODEL ADAPTATION

TECHNICAL FIELD

The present disclosure relates to hybrid-electric vehicles and more specifically to controlling an internal combustion engine.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a hybrid powertrain includes an engine having a crankshaft and a throttle body, and an electric machine having a rotor selectively coupled to the crankshaft via a disconnect clutch. A transmission of the powertrain includes a torque converter having an impeller fixed to the rotor, a turbine disposed on an input shaft of the transmission, and a bypass clutch configured to selectively transmit torque from the impeller to the turbine. A vehicle controller is programmed to, in response to the bypass clutch being open or slipping and the disconnect clutch being closed, command a throttle position of the throttle body based on an error between measured and estimated speeds of the impeller.

According to another embodiment, a vehicle includes an engine and an electric machine selectively coupled to the engine via a disconnect clutch. A torque converter has an impeller, a turbine, and a bypass clutch. A controller is programmed to, in response to the bypass clutch being open or slipping and the disconnect clutch being closed, generate a torque command for the engine based on an error between measured and estimated speeds of the impeller.

According to yet another embodiment, a vehicle includes an engine having a throttle body and an electric machine selectively coupled to the engine via a disconnect clutch. A torque converter of the vehicle has an impeller, a turbine, and a bypass clutch. The vehicle also includes a controller programmed to, in response to the bypass clutch being open or slipping and the disconnect clutch being closed, command a throttle position of the throttle body based on an error between measured and estimated speeds of the impeller.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
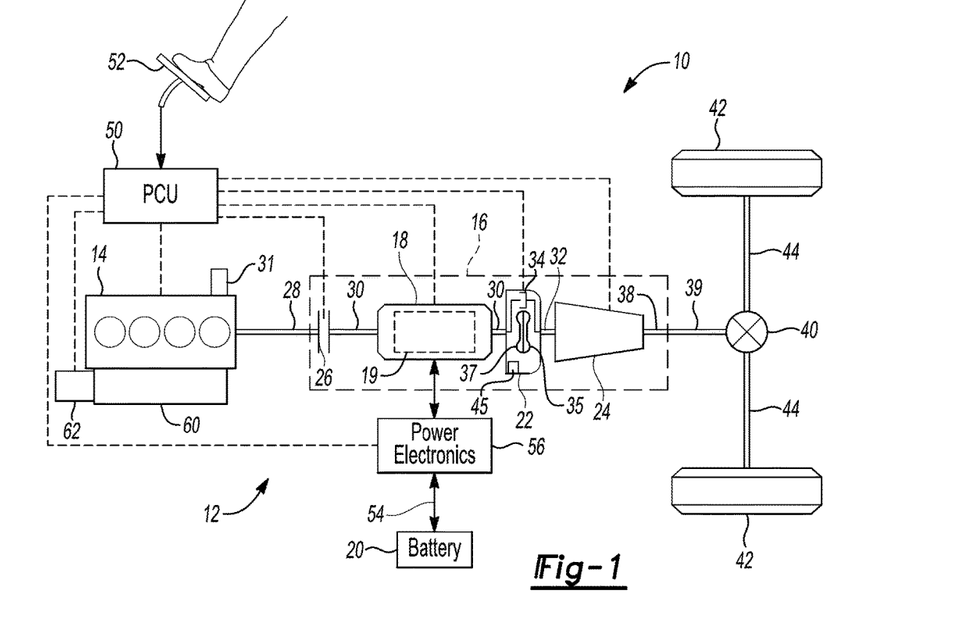
FIG. 1 is a schematic diagram of an example hybrid-electric vehicle.

Referring to FIG. 1, a schematic diagram of a hybrid-electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12 having an engine 14 that drives a transmission 16, which may be referred to as a modular-hybrid transmission (MHT). As will be described in further detail below, a transmission 16 includes an electric machine such as an electric motor/generator (M/G) 18, an associated traction battery 20, a torque converter 22, and a multiple step-ratio automatic transmission, or gearbox 24. The M/G 18 may also be referred to as the motor 18.

The engine 14 and the M/G 18 are both drive sources for the HEV 10. The engine 14 generally represents a power source that may include an internal-combustion engine such as a gasoline, diesel, or natural gas powered engine, or a fuel cell. The engine 14 generates an engine power and corresponding engine torque that is supplied to the M/G 18 when a disconnect clutch (K0 clutch) 26 between the engine 14 and the M/G 18 is at least partially engaged. The M/G 18 may be implemented by any one of a plurality of types of electric machines. For example, M/G 18 may be a permanent-magnet-synchronous motor. Power electronics 56 condition direct current (DC) provided by the battery 20 to the requirements of the M/G 18, as will be described below. For example, power electronics may provide three-phase alternating current (AC) to the M/G 18.

When the disconnect clutch 26 is at least partially engaged, power flows from the engine 14 to the M/G 18. Power flow from the M/G 18 to the engine 14 is also possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. The shaft 30 extends through the M/G 18. The rotor 19 of the M/G 18 is fixed on the shaft 30, whereas the engine 14 is selectively driveably connected to the shaft 30 only when the disconnect clutch 26 is at least partially engaged.

A separate starter motor 31 can be selectively engaged with the engine 14 to rotate the engine to allow combustion to begin. The starter motor 31 may be powered by a 12-volt system of the vehicle. Once the engine is started, the starter motor 31 can be disengaged from the engine via, for example, a solenoid that engages/disengages a pinion gear with the ring gear on the flywheel (not shown). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is driveably connected to the torque converter 22 via the shaft 30. For example, the torque-converter housing may be fastened to the shaft 30. The torque converter 22 is therefore driveably connected to the engine 14 when the disconnect clutch 26 is at least partially engaged. Two components are driveably connected if they are connected by a power flow path that constrains their rotational speeds to be directly proportional. The torque converter 22 includes an impeller 35 fixed to the torque-converter housing (and consequently, fixed to the rotor 19) and a turbine 37 fixed to a transmission input shaft 32 that is driveably connected to the driven wheels 42. The torque converter 22 provides a hydraulic coupling between the shaft 30 and the transmission input shaft 32. The torque converter 22 transmits power from the impeller 35 to the turbine 37 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may be provided to, when engaged, frictionally or mechanically couple the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, the disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 32. The gearbox 24 is automatically shifted from one ratio to another based on various vehicle and ambient operating conditions by an associated controller, such as a powertrain-control unit (PCU) 50. The gearbox 24 then provides powertrain output torque to output shaft 38. The output shaft 38 may be connected to a driveline 39 (e.g., a driveshaft and universal joints) that connects the output shaft 38 to the differential 40.

It should be understood that the hydraulically controlled gearbox 24 used with a torque converter 22 is but one example of a gearbox or transmission arrangement; any multiple-ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 38 may be connected to a driveline 39 that connects the output shaft 38 to the differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

While illustrated as one controller, the controller 50 may be part of a larger control system and may be controlled by various other controllers throughout the vehicle 10, such as a vehicle-system controller (VSC) and a high-voltage battery controller (BECM). It is to be understood that the powertrain-control unit 50 and one or more other controllers can collectively be referred to as a "controller" that controls various actuators in response to signals from various sensors to control functions such as starting/stopping engine 14, operating M/G 18 to provide wheel torque or charge the battery 20, select or schedule transmission shifts, etc. For example, the M/G 18 may include a speed sensor 45 configured to output a signal to the controller 50 that is indicative of a speed of the M/G. The controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine, traction battery, transmission, or other vehicle systems.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 50 may communicate signals to and/or from the engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air-conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure (if applicable), crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust-gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. The pedal 52 may include a pedal-position sensor. In general, depressing and releasing the pedal 52 causes the pedal sensor to generate an accelerator-pedal-position signal that may be interpreted by the controller 50 as a demand for increased power or decreased power, respectively. Based at least upon input from the pedal, the controller 50 commands torque from the engine 14 and/or the M/G 18. The controller 50 also controls the timing of the gear shifts within the gearbox 24, as well as engagement or disengagement of the disconnect clutch 26 and the torque converter bypass clutch 34. Like the disconnect clutch 26, the bypass clutch 34 can be modulated across a range between the engaged and disengaged positions. This produces a variable slip in the torque converter 22 in addition to the variable slip produced by the hydrodynamic coupling between the impeller and the turbine. Alternatively, the bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as "hybrid mode," "engine-motor mode," or "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter and a DC/DC converter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive (e.g. drive) or negative (e.g. regenerative) torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely an example and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The vehicle-control system (which includes the controller 50) determines a driver-demanded torque based on signals from a pedal-position sensor associated with the accelerator pedal 52. This torque may be delivered by placing the powerplants (e.g., engine and motor) in torque control. In torque control, the controller determines a torque split between the engine and the motor and commands that torque from each of the powerplants.

Figure 2:
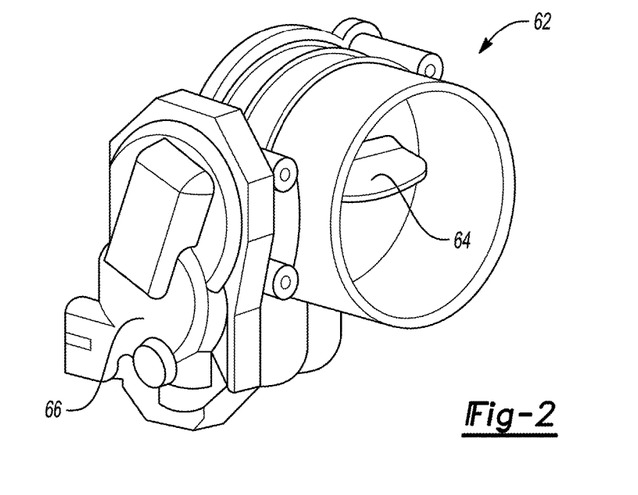
FIG. 2 is perspective view of a throttle body.

Referring to FIGS. 1 and 2, in one or more embodiments, the engine 14 is a gasoline engine that produces torque by combusting a fuel-air mixture. The engine 14 includes an intake manifold 60 defining passageways that direct intake air into each of the cylinders. A throttle body 62 is connected to an inlet side of the manifold 60 and has a valve 64 that controls the mass of air entering the intake manifold 60. The throttle body 62 is electronically controlled and includes an actuator 66 that controls position of the valve 64 based on a throttle-valve-position signal received from the controller 50. The valve is rotatable between an idle position and a wide-open throttle position, as well as a range of intermediate positions. An inlet side of the throttle body 62 is connected to a tube that supplies ambient air to the throttle body 62. Generally, the torque produced by the engine is increased by further increasing the valve opening and increasing supplied fuel, and the torque produced by the engine is generally decreased by decreasing the valve opening and decreasing supplied fuel.

In vehicles with multiple powerplants, such as vehicle 10, it is important that each powerplant accurately produces the demanded torque. Inaccuracies in the torque can lead to vehicle speed increasing or decreasing without the driver requesting it. Accurately controlling the powerplants using torque control is particularly difficult during transition events where the torque split between the actuators changes, such as during engine start, because it is difficult to accurately estimate the instantaneous capacity of the disconnect clutch. During engine start, it may be advantageous to utilize speed control of at least one of the actuators to reduce torque delivery errors. For example, the motor 18 may be placed in speed control during engine start. In speed control, the controller may set a target motor speed and measure the speed of the motor. The controller may compare these speeds and output a torque request to the motor based on an error between these speeds.

Speed control provides an inherent robustness to torque delivery errors. In the following example, a torque converter model is used to generate a target motor speed, which allows M/G 18 to be controlled using speed control. Speed control of the M/G 18 can be utilized during any condition where the torque converter bypass clutch is not fully locked (i.e., open or slipping). When the driver applies the accelerator pedal, the vehicle control system determines a driver-demanded torque. As long as the torque-converter capacity is less than this driver-demanded torque, there will be slip across the torque converter. The amount of slip, and thus the desired impeller speed, can be predicted using a model of the torque converter. Because achieving the speed target is equivalent to achieving driver-demanded torque, the M/G can be placed in speed control and track this target. This provides robustness against torque delivery errors. An example algorithm for speed controlling the M/G 18 will be described below in more detail.

In an ideal scenario, the actuators and the model would be 100% accurate, but that may not always be true. The accuracy of the torque-converter model can be identified when the torque converter is opening or slipping. The accuracy of the torque-converter model can be determined by comparing the closed-loop impeller torque to the driver-demand torque request. The torque error between these signals can be used to adapt the torque-converter model. Even if the system is operating in torque control, the accuracy of the torque-converter model can be determined by comparing the estimated required impeller speed to the measured impeller speed. This error could also be used to adjust the torque-converter model estimate. These approaches can significantly reduce any errors in the torque-converter model and maximize the benefits provided by speed control.

Figure 3:
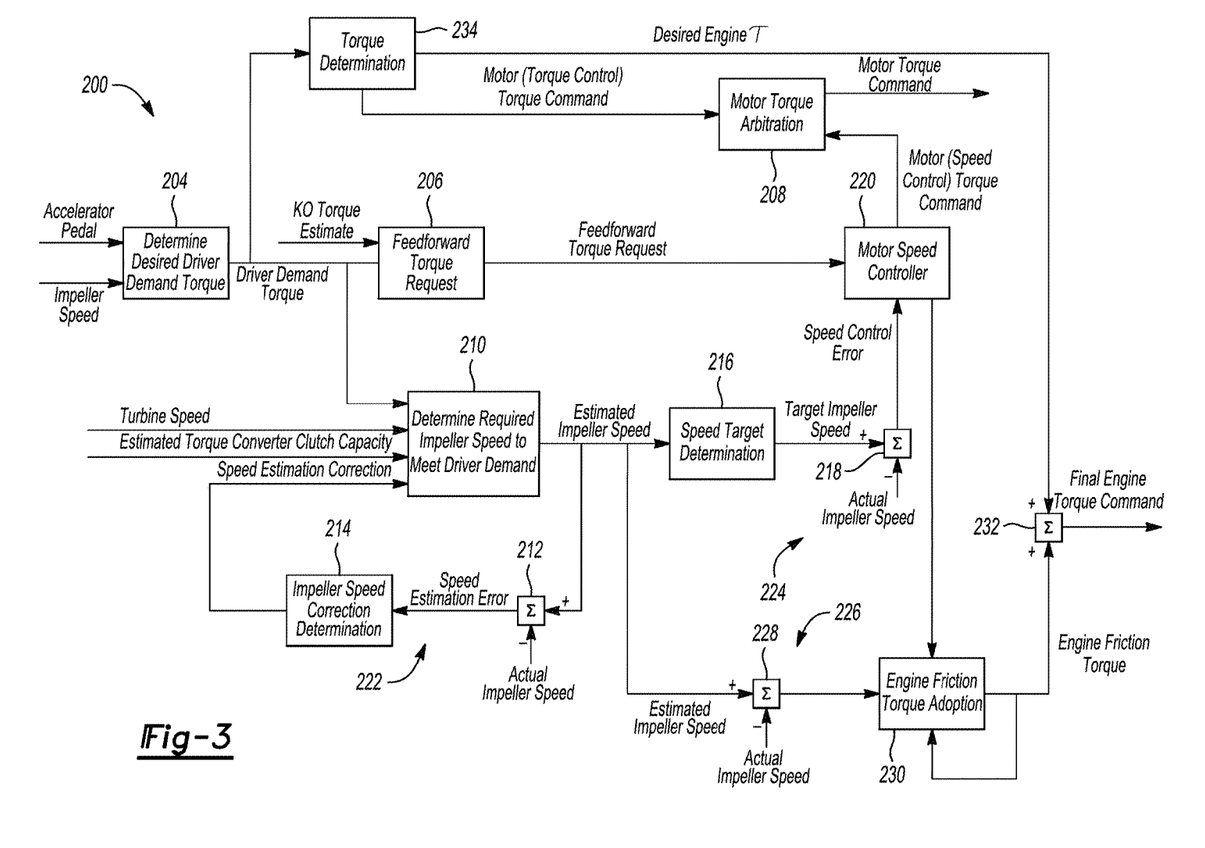
FIG. 3 is a flow chart illustrating a method for correcting an estimated speed of an impeller during torque control of an electric machine.
Figure 4:
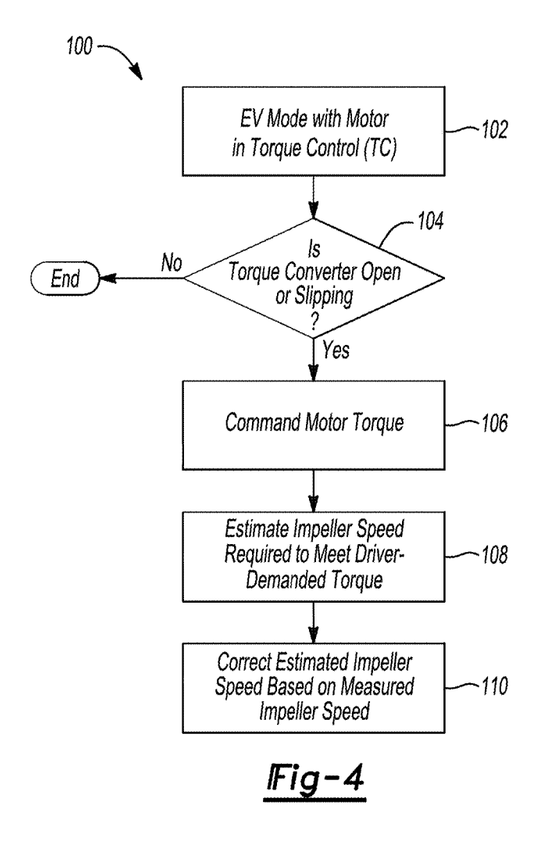
FIG. 4 is a control diagram illustrating an algorithm for controlling a powertrain of the vehicle of FIG. 1.

Referring to FIGS. 3 and 4, the torque-converter model may be adapted when the torque converter is open or slipping and the vehicle is in torque control. In this example, the vehicle is in EV mode, however, the model may also be adapted when the engine is at least partially propelling the vehicle. At operation 102, the vehicle is in EV mode and the motor is in torque control. At operation 104 the controller determines if the torque converter is open or slipping. If yes, control passes to operation 106. If not, the routine ends.

At operation 106, the controller commands a motor torque. The commanded motor torque is based on a driver-demanded torque and an estimated disconnect clutch torque. The driver-demanded torque is determined at box 204 based on an accelerator-pedal position and an impeller speed. The impeller speed may be directly measured or inferred. In vehicle 10, the motor speed and the impeller speed are the same because these components are fixed to each other. In control diagram 200, impeller speeds are being used, but motor speeds could be used instead. In other vehicle architectures, such as when the motor is downstream of the torque converter, the impeller speed must be used. The driver-demanded torque is fed into box 234 and a motor torque request for torque control mode is output. In this example, the requested motor torque is equal the driver-demanded torque because the engine is OFF so 100 percent of the driver-demanded torque is supplied by the motor. When the engine is ON, controls represented by box 234 determine a torque split between the engines 14 and the motor 18. Box 208 determines the final motor torque command. During motor torque control mode, the motor torque command is equal to the torque control motor torque command.

The control logic of boxes 210 to 214 are not actively determining a torque command during torque control, but the logic within those boxes can be used to adapt the torque-converter model when the motor is in torque control. At operation 108, the controller estimates the impeller speed required to meet driver-demanded torque at box 210. Box 210 receives the driver-demanded torque, the turbine speed, and an estimated torque converter bypass clutch capacity. Using these inputs, an estimated impeller speed may be calculated using equation 1, where, $\tau_{impeller}$ is torque at the impeller, $\tau_{bypass}$ is torque on the torque converter bypass clutch, $\omega_I$ is the impeller speed and K is a f (turbine speed and impeller speed).

$$\tau_{impeller} = K(\omega_I)^2 \tau_{bypass\ clutch} \qquad \text{Eq. (1)}$$

Since the desired impeller torque (equal to driver-demanded torque in this example), the torque converter bypass clutch capacity, and the turbine speed are known, the controller can determine an impeller speed that provides the driver-demanded torque using equation 1. It should be noted that the driver-demanded torque could also be determined in terms of a desired turbine torque. The turbine torque can be related to impeller torque using a torque ratio (r) which is a function of turbine speed and impeller speed as shown by equation 2.

$$\tau_{turbine} = r\tau_{impeller} \qquad \text{Eq. (2)}$$

The estimated impeller speed ($\omega_{I,estimated}$) and a measured impeller speed ($\omega_{I,measured}$) are feed into box 212 and an error (e) is determined using equation 3.

$$e = \omega_{I,estimated} - \omega_{I,measured} \qquad \text{Eq. (3)}$$

The error is feed into box 214. At operation 110 the controller, using the logic in box 214, adapts the torque-converter model based on the error from box 212. The model may be continuously adapted at predefined frequency when the motor is in torque control. The model may be adapted using equation 4, where $N_{I,corr}$ is the impeller speed estimator correction, $\alpha_I$ is a correction learn, and e is the error from equation 3.

$$N_{I,corr} = \alpha_I \int e \, dt \qquad \text{Eq. (4)}$$

Figure 5:
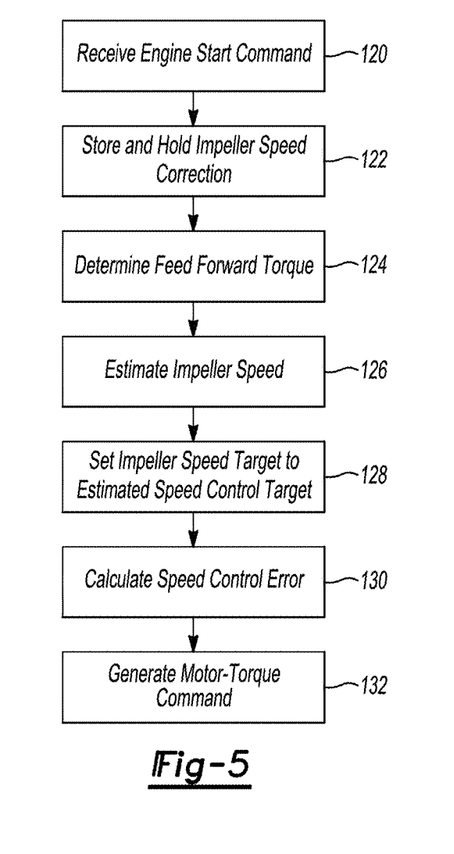
FIG. 5 is a flow chart illustrating a method of generating a torque command for the electric machine during speed control of the electric machine.

Referring to FIGS. 4 and 5, at operation 120 the controller receives an engine-start command. In this example, the vehicle is in torque control prior to the engine-start request, and in response to the engine-start request, the vehicle switches to speed control. At operation 122, the controller stores and holds the last impeller speed correction ($N_{I,corr}$) for later use. Using the last impeller speed correction as an input to box 210, provides a more accurate estimated impeller speed output from box 210. This reduces or prevents a spike in the motor speed when the motor switches from torque control to speed control. At operation 124 the controller determines a feedforward component of the motor-torque command. The feedforward component may be calculated using boxes 204 and 206.

At operation 126 the controller estimates the impeller speed at box 210 using equation 1. For the first iteration of speed control, the inputs to box 210 include the turbine speed, the estimated torque convert clutch capacity and the held impeller speed correction. In subsequent iterations, the held speed correction may be used as an input to box 210 or the speed correction may decay to zero over a predetermined period of time. Boxes 212 and 214 may be inactive during speed control.

At operation 128 the target impeller speed is set to the estimated impeller speed at box 216. Box 216 may contain logic that passes the estimated impeller speed though unchanged, albeit now as a target impeller speed. Or, may modify the estimated impeller speed by applying smoothing or filtering.

The target impeller speed is fed into box 218 and is compared to the measured impeller speed to determine a speed error at operation 130. At operation 132 a motor-torque command is generated. A magnitude of the torque command is determined by logic represented by box 220. The torque command includes a feedforward component and a feedback component. The feedforward component is determined by logic represented by box 206 and the feedback component is based on the error from box 218. In box 220, the error is converted into a feedback torque that is combined with the feedforward torque to generate a final motor-torque command.

The speed control logic 200 may include a trio of feedback loops 222, 224, and 226. Loop 222 compensates for torque-delivery errors associated with the engine, the motor, and the torque-converter model. Loop 224 compensates for torque-delivery errors associated with the disconnect clutch torque estimate. The operations of these were described above. The third loop 226, which has not been described yet, compensates for errors in the engine-friction model.

Internal-combustion engines have friction losses that must be accounted for to accurately estimate the output torque of the engine at the crankshaft. The friction losses vary based on many factors including engine temperature, engine torque, engine speed, elevation of the vehicle, engine age, and many others. Some of these factors, such as engine speed, engine temperature, and engine torque very significantly within a single drive cycle. As such, are dynamic values must be recalculated multiple times within a single drive cycle. Vehicle controllers include an engine friction torque model that estimates the friction losses of the engine.

In a conventional vehicle, the engine friction torque model is adapted during idle operation. Idle operation occurs frequently and adaption of the engine friction torque model can be learned very accurately. In a hybrid vehicle, such as vehicle 10, the engine 14 is rarely at idle. The engine is typically OFF to preserve fuel when the vehicle is stopped and is operated in a torque-producing state when ON. Therefore, engine friction adaption module used for conventional vehicles is not an optimal solution for hybrid vehicles have the architecture of FIG. 1 or similar architecture.

Moreover, the accuracy of the engine friction torque model is more important in a hybrid vehicle than in a conventional vehicle due to the hybrid vehicle splitting the driver-demanded torque between the engine and an electric machine(s). If the engine friction torque model is inaccurate, the delivered engine output torque becomes inconsistent. This is particularly problematic in the hybrid architecture of FIG. 1 because, unlike a power-split hybrid, engine torque is not virtually measured by a generator.

Feedback loops 222 and 224 utilized a torque-converter model to estimate the impeller speed required to deliver driver-demanded torque. A similar strategy can be used in feedback loop 226 to learn engine torque delivery errors.

Impeller speed errors occurring during the period of time after the disconnect clutch is locked and the motor is still in speed control can be attributed to errors in the engine friction torque model. When speed control is exited, the motor feedback torque cannot be immediately removed because the net delivered torque would change. The learned torque correction can be shifted from the motor speed controller (integral term) to the engine friction model rather than ramping the feedback torque to zero. With this approach, the actual delivered impeller torque stays constant. As long as the torque converter remains open or slipping, the impeller speed required meet driver-demanded torque can be continuously compared to the actual impeller speed to provide an error term for continuously adapting the engine friction torque model. Feedback loop 226 and flow chart 250 of FIG. 6 describe example controls for adapting the engine friction torque model.

Figure 6:
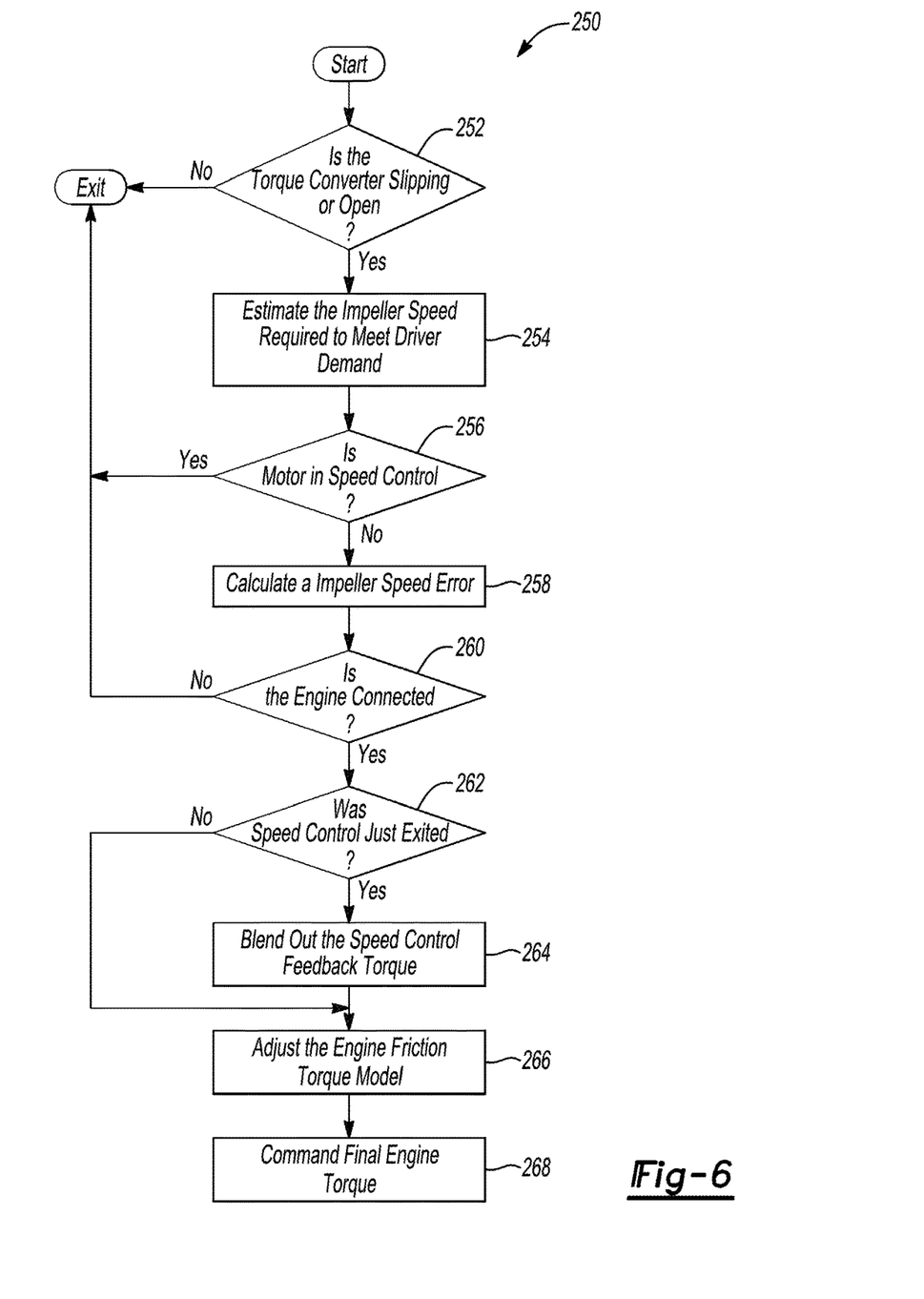
FIG. 6 is a flow chart illustrating a method for generating a final engine-torque command.

Referring to FIGS. 4 and 6, the control logic 250 starts at operation 252 and the controller determines if the torque converter bypass clutch is open or slipping. If no, the control logic is exited. If yes, control passes to operation 254 and the controller estimates the impeller speed required to meet driver demand. The impeller speed to meet driver demand is calculated at box 210 as described above. Control passes to operation 256 and the controller determines if the motor is in speed control. If yes, control is exited. If no, control passes to operation 258 and the controller calculates a speed error between the estimated impeller speed and the actual impeller speed. The speed error is determined at box 228 using equation 3.

At operation 260, the controller determines if the engine is connected to the motor, i.e. the disconnect clutch is closed. If no, control exits. If yes, the controller determines if speed control was just exited. This may be determined by logging previous iterations and flagging when the control switches from requesting speed control to requesting torque control. If speed control was just exited, control passes to operation 264 and the last motor torque command from box 220 is feed into box 230 to adapt the engine friction torque model.

When motor speed control is active, the motor torque command can be calculated using a combination of feedforward and feedback components using equation 5:

$$\tau_{mtr} = J\frac{d\omega\text{commanded}}{dt} + \tau_{conv} - \tau_{K0} + P \cdot e + I\int e\,dt + D \cdot \dot{e} \qquad \text{Eq. (5)}$$

where J is inertia of the impeller; $\tau_{conv}$ is the estimated torque converter load; $\tau_{K0}$ is the estimated disconnect clutch torque; ω is angular speed of the motor; e is the error between $\omega_{commanded}$ and $\omega_{measured}$; and P, I, and D are constants of the PID control.

At operation 266 the engine friction torque model is adapted based on the speed error calculated in box 228. Equation 6 is an example engine friction torque model according to one or more embodiments. In equation 6, $\tau_{friction}$ may be a function of engine speed ($\omega_{eng}$), engine torque ($\tau_{eng}$), engine temperature, elevation of the vehicle and others, and engine friction torque correction ($\tau_{friction\_corr}$) is equal to $$\tau_{friction_{cor\_last\,value}} + K(\omega_{eng\_actual} - \omega_{eng\_estimated}).$$

"K" is a weighting factor. The present engine friction torque is calculated by adjusting the last engine friction torque $$\left(\tau_{friction_{corr\_last\,value}}\right)$$

based on the speed error of the impeller, e.g., $K(\omega_{eng\_act} - \omega_{eng\_est})$.

$$\tau_{eng\_friction} = \tau_{friction\_corr} - \tau_{friction} \qquad \text{Eq. (6)}$$

In one or more embodiments, the engine friction torque model may only be adapted if the error between the estimated impeller speed and the actual impeller speed exceeds a threshold value to reduce the frequency of the engine friction torque model being adapted. The threshold value may be a 25 to 100 revolution per minute (RPM) difference between the estimated and measured impeller speeds.

The engine-friction torque calculated at box 230 is feed to box 232 where it is combined with the desired engine torque to calculate a final engine-torque command. In one or more embodiments, the final engine-torque command is calculated using equation 7.

$$\text{Final Engine Torque} = \tau_{eng\_friction} + \tau_{eng\_desired} \qquad \text{Eq. (7)}$$

The desired engine torque may be a driver-demanded torque that is based on the position of the accelerator pedal, may be a controller-demanded torque (the controller may demand engine torque when the battery is being charged and in other situations), or may be a combination of both. Methods of determining a torque split between the motor and the engine are known and will not be described here. The engine-torque component from box 234 is feed to box 232, and is combined with the output of box 230 to calculate the final engine-torque command using equation 7.

At operation 268, the various components of the engine such as the throttle body, the spark plugs, the fuel injectors, the valve timing, and others are actuated accordingly to produce the final engine torque commanded by the controller at box 232. For example, the opening i.e., throttle position, of throttle body may be increased or decreased based on the final engine torque command.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A hybrid powertrain comprising:
   an engine having a crankshaft and a throttle body;
   an electric machine including a rotor selectively coupled to the crankshaft via a disconnect clutch;
   a transmission including a torque converter having an impeller fixed to the rotor, a turbine disposed on an input shaft of the transmission, and a bypass clutch configured to selectively transmit torque from the impeller to the turbine; and
   a controller programmed to, in response to the bypass clutch being open or slipping and the disconnect clutch being closed, command a throttle position of the throttle body based on an error between measured and estimated speeds of the impeller.

2. The hybrid powertrain of claim 1, wherein the controller is further programmed to increase the throttle position in response to the measured speed of the impeller being less than the estimated speed of the impeller.

3. The hybrid powertrain of claim 1, wherein the controller is further programmed to decrease the throttle position in response to the measured speed of the impeller exceeding the estimated speed of the impeller.

4. The hybrid powertrain of claim 2, wherein the controller is further programmed to inhibit the increase in throttle position in response to the error between measured and estimated speeds of the impeller being less than or equal to a threshold value.

5. The hybrid powertrain of claim 1, wherein the controller is further programmed to:
generate a motor feedback torque adjustment during speed control; and
in response to the powertrain switching from speed control to torque control, command a throttle position of the throttle body based on the motor feedback torque adjustment.

6. The hybrid powertrain of claim 1, wherein the estimated speed of the impeller is based on a second error between measured and estimated speeds of the impeller calculated when the disconnect clutch was open.

7. A vehicle comprising:
an engine;
an electric machine selectively coupled to the engine via a disconnect clutch;
a torque converter including an impeller, a turbine, and a bypass clutch; and
a controller programmed to, in response to the bypass clutch being open or slipping and the disconnect clutch being closed, generate a torque command for the engine based on an error between measured and estimated speeds of the impeller.

8. The vehicle of claim 7, wherein the torque commend includes a first component based on a driver-demanded torque and a second component based on the error between measured and estimated speeds of the impeller.

9. The vehicle of claim 7, wherein the torque command is further based on a temperature of the engine.

10. The vehicle of claim 7, wherein the controller is further programmed to increase a magnitude of the torque command in response to the measure speed of the impeller being less than the estimated speed of the impeller.

11. The vehicle of claim 7, wherein the estimated speed of the impeller is based on a second error between measured and estimated speeds of the impeller calculated when the disconnect clutch was open.

12. The vehicle of claim 7, wherein the engine includes a crankshaft, and the electric machine further includes a rotor selectively coupled to the crankshaft by the disconnect clutch.

13. The vehicle of claim 12, wherein the impeller is fixed to the rotor.

14. The vehicle of claim 7, wherein the controller is further programmed to generate the torque command for the engine based on an error between measured and estimated speeds of the impeller only if the error exceeds a threshold value.

15. A vehicle comprising:
an engine having a throttle body;
an electric machine selectively coupled to the engine via a disconnect clutch;
a torque converter having an impeller, a turbine, and a bypass clutch; and
a controller programmed to, in response to the bypass clutch being open or slipping and the disconnect clutch being closed, command a throttle position of the throttle body based on an error between measured and estimated speeds of the impeller.

16. The vehicle of claim 15, wherein the electric machine includes a rotor that is coupled to the impeller.

17. The vehicle of claim 15, wherein the controller is further programmed to increase the throttle position in response to the measured speed of the impeller being less than the estimated speed of the impeller.

18. The vehicle of claim 17, wherein the controller is further programmed to inhibit the increase in throttle position in response to the error between measured and estimated speeds of the impeller being less than or equal to a threshold value.

19. The vehicle of claim 15, wherein the controller is further programmed to decrease the throttle position in response to the measured speed of the impeller exceeding the estimated speed of the impeller.

20. The vehicle of claim 15, wherein the controller is further programmed to:
generate a motor feedback torque adjustment during speed control; and
in response to the electric machine switching from speed control to torque control, command a throttle position of the throttle body based on the motor feedback torque adjustment.

* * * * *